March 15, 1932.                M. A. SNOW                1,849,963
                            ADJUSTABLE BEARING
                            Filed Oct. 30, 1929
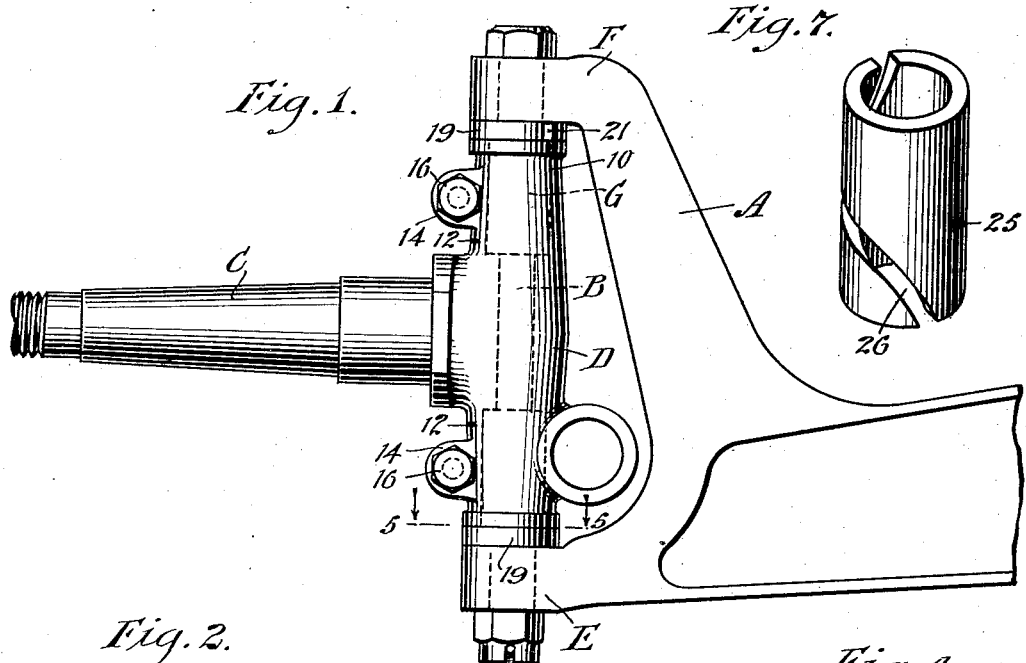
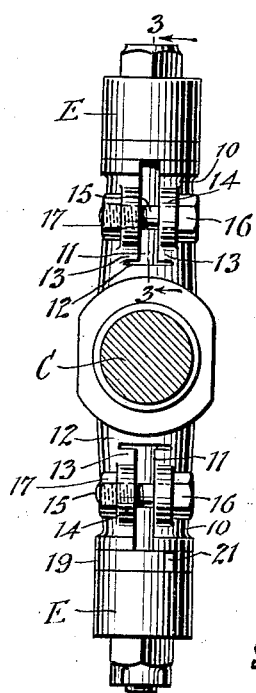
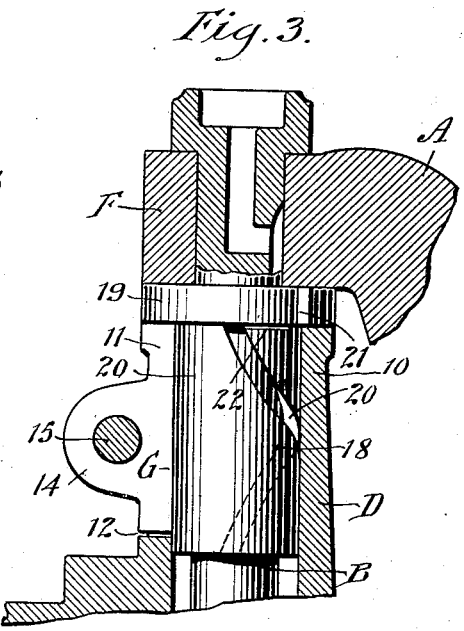
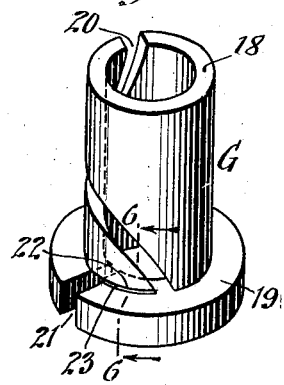
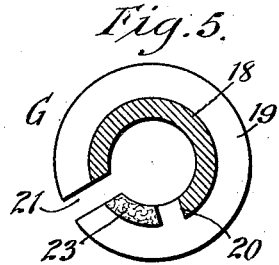
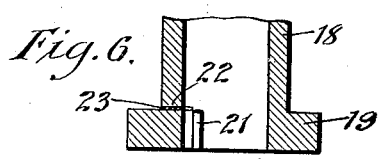
WITNESSES
Edw. Thorpe
Hugh H. Ott
INVENTOR
Matthew A. Snow
BY
Munn & Co.
ATTORNEY Patented Mar. 15, 1932

1,849,963

UNITED STATES PATENT OFFICE

MATTHEW A. SNOW, OF BROOKLYN, NEW YORK

ADJUSTABLE BEARING

Application filed October 30, 1929. Serial No. 403,580.

This invention relates generally to bearings and while not necessarily restricted thereto, is particularly designed as an improved bearing for the steering wheel spindle of automobiles for receiving therethrough the king bolt.

In so far as is known, there is no effective means now in existence for adjusting such bearings when even slight wear on the bushing results in shimmying of the wheels or lost motion in a shaft and hence the bushings must be replaced by new ones entailing a considerable expense due to the time and labor involved, in addition to the cost of the bushings.

It is, therefore, the outstanding object of the present invention to provide an improved king pin or shaft bearing which is adjustable to such an extent that the bushings may be used until they are completely worn out; in fact, the adjustment contemplated will be sufficient to render the bearing useful to the full extent of the life of the vehicle or machine upon which it is installed.

More specifically, the invention comprehends an adjustable bearing which comprises in combination a circumferentially adjustable bearing member and a circumferentially adjustable bushing arranged in the bearing member, whereby the bushing may be contracted into close contact with a shaft passing therethrough by contraction of the bearing member.

The invention furthermore comprehends a bushing for use in a circumferentially adjustable bearing element, which bushing consists of a cylindrical body which is split in such a manner as to allow for its contraction without causing undue wear adjacent the split portion thereof and without permitting lubricant supplied to the bearing too free an exit therefrom.

The invention further embodies for use in connection with a circumferentially adjustable bushing, a bearing member having an end portion thereof split in such a manner as to allow for uniform circumferential contraction of the split portion.

Other objects of the invention reside in the comparative simplicity of construction of the bearing, the economy with which it may be produced and maintained in adjustment and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a front view of an automobile steering knuckle equipped with a king pin bearing constructed in accordance with the invention.

Figure 2 is a side view thereof.

Figure 3 is a fragmentary enlarged sectional view therethrough taken approximately on the line indicated at 3—3 in Figure 2.

Figure 4 is a perspective view of the bushing element of the bearing removed.

Figure 5 is a horizontal sectional view through the bushing taken approximately on the line indicated at 5—5 in Figure 1.

Figure 6 is a fragmentary vertical sectional view taken approximately on the line indicated at 6—6 in Figure 4.

Figure 7 is a perspective view of a slightly modified form of bushing element.

Referring to the drawings, the bearing construction constituting the subject matter of the present invention is illustrated in its principal use as applied to the steering knuckle of an automobile for accommodating the king pin, although it is to be understood that the bearing is readily applicable to other uses, such as for a generator shaft, universal joint or pump shaft, or, in fact, for any shaft bearing which employs a bushing. In the drawings, A designates the front axial yoke which receives therethrough the king pin B, while C represents the wheel spindle which is formed with a tubular bearing D arranged between the upper and lower furcations E and F of the front axial yoke and which bearing element D has extending therethrough the king pin B. As is customary in bearings of this type, bushings designated generally by the reference character G are fitted within the upper and lower ends of the bearing element D and, obviously, when the slightest wear occurs on the bushings G or the king pin B, lost motion develops, which causes vibration or "shimmying" of the wheels. Up to the present time, the only remedy for this condition has been to install new bushings at a considerable expense for the time and labor involved in their replacement.

The present invention, therefore, broadly comprehends the use of circumferentially adjustable bushings and corresponding circumferentially adjustable portions of the bearing element D which receive and surround the bushings, it being apparent that contraction of the adjustable portions of the bearing will effect a corresponding circumferential contraction of the bushings. As illustrated, this is accomplished by slitting the bearing element D inwardly from its opposite ends 10, as at 11, said slits extending axially a distance slightly short of the inner ends of the bushings G and forming in communication with the slits 11, transverse slits 12 which present, in effect, gripping jaws 13, each of which is provided with an outwardly projecting ear 14. A stud bolt 15 having a head 16 extends loosely through one of the ears and is threaded in the opposite ear to afford means for effecting circumferential contraction of the end portions 10 of the bearing element D, a lock nut 17 being engaged over the protruding threaded end of the bolt to maintain the adjustment of the bearing.

The bushing G in the present instance comprises a cylindrical body 18 formed at one end with an enlarged head 19. The body 18 is formed preferably with a spiral slit 20, while the head portion 19 is formed with a radial axially extending slit 21, which slit 21 is circumferentially spaced from the end of the slit 20 which terminates at the head portion 19 of the bushing. Between the slits 20 and 21, the body or shank of the bushing is disconnected from the head portion by a very narrow slit 22, within which there is preferably arranged a filler strip 23 of felt or any other suitable material which will serve as a means for preventing the lubricant from flowing too freely from the terminus of the slit 20 through the slit 21. Under this construction and arrangement, it is obvious that the bushing G is rendered circumferentially contractible so that when the same is arranged within the end portion 10, contraction of the end portion will effect a corresponding contraction of the bushing to take up or compensate for wear on the bushing or shaft or pin B. It will also be observed that the spiral slit 20 in the bushing G will avoid undue wear at the slitted portion and will further tend to equalize the wear throughout the length of the body 18. It will also be apparent that as applied to a steering knuckle, the king pin bearing and bushing may be adjusted to compensate for wear by merely tightening the stud bolts 15 and due to the amount of adjustment allowed for in the bushing, the same will last for the length of the life of the vehicle, thereby eliminating the necessity of replacing the bushings.

In the modified form of bushing element illustrated in Figure 7 of the drawings, a cylindrical body 25 is formed with a spiral slit 26 and operates in conjunction with the bearing element D in the same manner as described, with the exception that in this instance the head 19 is dispensed with.

What is claimed is:

1. An adjustable shaft bearing including a tubular spirally split bushing adapted to be circumferentially contracted about its shaft to compensate for wear on the bushing and shaft, and means at one end of said bushing for retarding the escape of lubricant from the bearing.

2. A bushing for use in a circumferentially adjustable bearing element, said bushing comprising a cylindrical body formed with an enlarged head at one end, said body being spirally split, said head being axially split at a point circumferentially spaced from the slit in the body and said body and head being disconnected for that portion which extends between the two splits.

3. A circumferentially adjustable bushing for use in a circumferentially adjustable bearing, said bushing including a tubular spirally split shank, an enlarged head at one end of said shank formed with a radial axially extending slit circumferentially spaced from the split terminal of the shank, said shank and head being disconnected between said splits.

4. A circumferentially adjustable bushing for use in a circumferentially adjustable bearing, said bushing including a tubular spirally split shank, an enlarged head at one end of said shank formed with a radial axially extending slit circumferentially spaced from the split terminal of the shank, said shank and head being disconnected between said splits, and a filler strip interposed between the shank and head at the disconnected portion thereof.

MATTHEW A. SNOW.